April 5, 1938.  B. A. BENSON  2,113,041
ELECTRIC CORN POPPER
Filed May 10, 1937  2 Sheets-Sheet 1
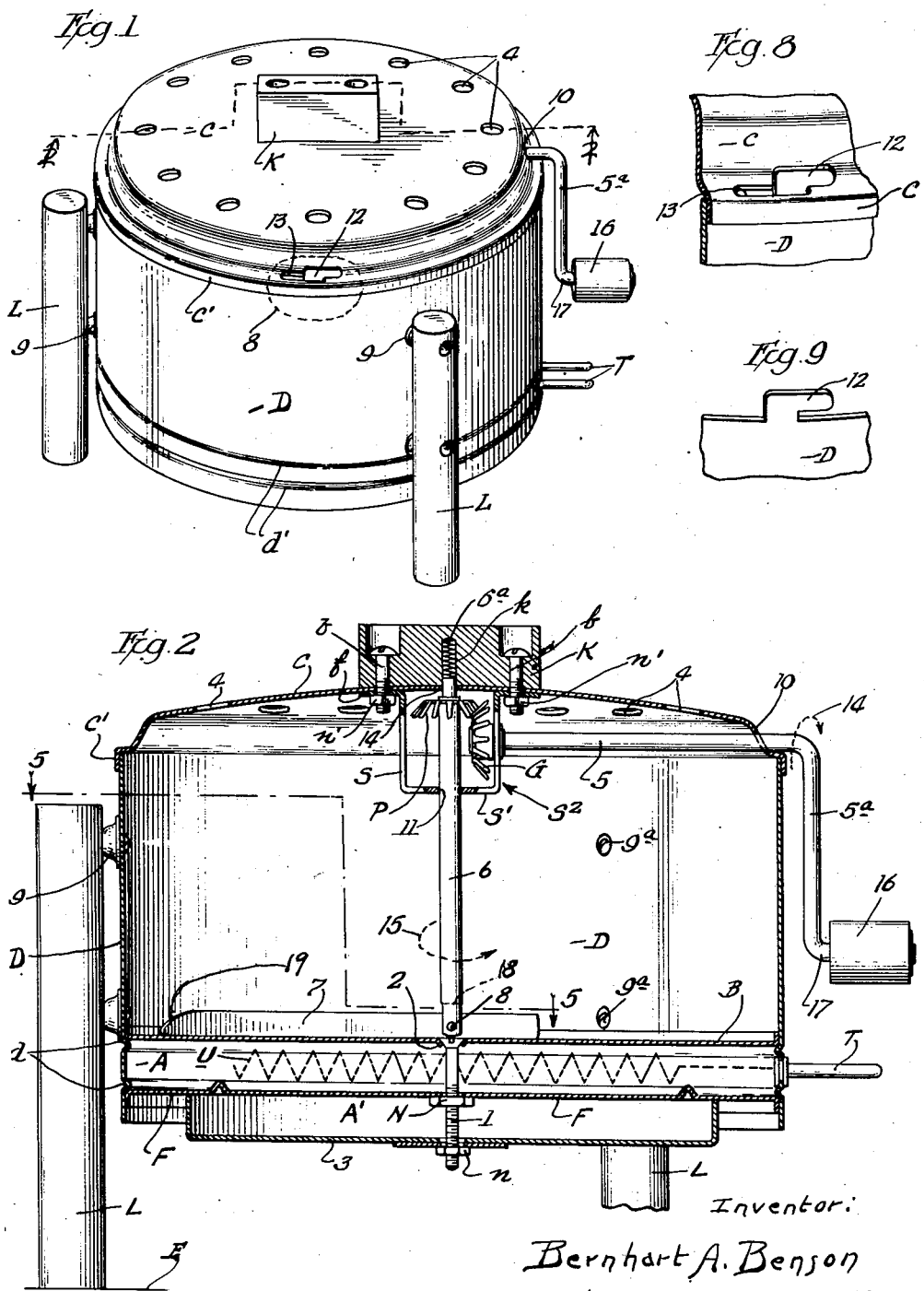
Inventor:
Bernhart A. Benson
by Albert Scheible
Attorney April 5, 1938. B. A. BENSON 2,113,041
ELECTRIC CORN POPPER
Filed May 10, 1937 2 Sheets-Sheet 2
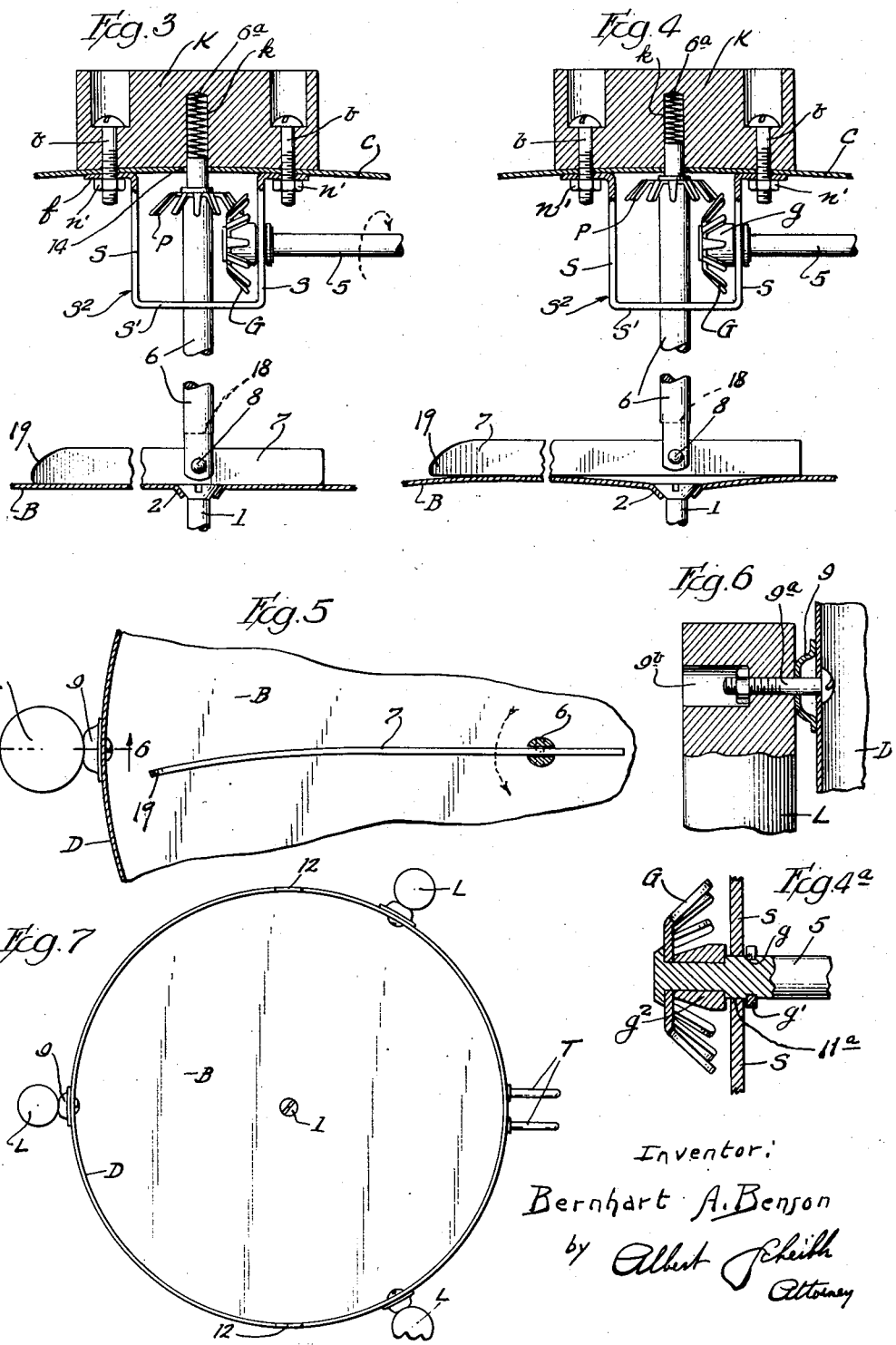
Inventor:
Bernhart A. Benson Patented Apr. 5, 1938

2,113,041

UNITED STATES PATENT OFFICE 2,113,041

ELECTRIC CORN POPPER

Bernhart A. Benson, Chicago, Ill., assignor to Chicago Electric Manufacturing Company, Chicago, Ill., a corporation of Illinois Application May 10, 1937, Serial No. 141,595

15 Claims. (Cl. 53—4)

My invention relates to improvements in corn poppers of the class in which the cover supports a manually rotatable stirrer by which the corn resting on the bottom of the popper can be shifted in position so as to prevent unpopped corn from scorching and also to cause unpopped corn to drop upon the said bottom for displacing the considerably lighter popped corn.

In a popper of this type, the stirrer is most effective when it is disposed quite close to, or even scrapes upon, the bottom of the popper, and also when the stirrer itself is substantially rigid so as not to be bent out of its normal shape by the resistance which jamming portions of the corn may offer. It has heretofore been proposed to use a stirrer rigid with the operating shaft and being seated upon the usually flat bottom of such a corn popper. However, when such a bottom is constructed of thin sheet metal, the expansion of such a bottom by heat applied from below it (as for example by an electric heating unit underlying this bottom) causes the bottom to bulge upward so that the stirrer will only have a quite small portion of its length seated upon the bottom or even sufficiently close to the latter for real effectiveness.

Moreover, if the stirrer is rigidly supported by a vertical shaft which extends upwardly through the usual cover of such a corn popper and which is rotated by a crank attached directly to the shaft part above the cover, a manual rotating of this shaft almost invariably causes the user to press the shaft downward so that the forcible scraping of the stirrer on the popper bottom materially resists the said rotation and also causes undue wear on this bottom. So also, when the stirrer rotating crank is disposed above the top of the popper, which top properly should have numerous ports for emitting hot air from the drum of the popper, the user is apt to have his hand and wrist unpleasantly heated by such hot air.

Furthermore, with electric corn poppers, the usual metal legs conduct heat from the popper so readily as to scorch or otherwise mar the top of any wooden table on which the popper may be seated, or to scorch a tablecloth on such a table, thereby preventing the positioning of such a corn popper on a dining room or living room table.

In addition, the spring latches commonly employed for retaining the cover of the popper in its normal position are apt to become bent so as to loosen, and likewise are likely to have the temper of the springs drawn so as to render them inoperative. When this occurs, the direct rotation of the stirrer shaft by a crank disposed above the cover is apt to rotate the cover somewhat along with the said shaft; and the user cannot readily prevent such rotation by grasping the body or legs of the popper because of the temperature which they reach during the popping operation. Consequently, the use of such a corn popper also frequently involves a considerable and undesirable rattling.

My present invention aims to overcome the above recited objections to corn poppers designed for household use by providing a corn popper including the following advantageous features:

(1) The supporting of the upright stirrer-rotating shaft in such a manner that the shaft can readily be slid upwards by the upward bulging of the heated popper bottom while still permitting the stirrer to rest by gravity on the bottom.

(2) The providing of spring means continuously urging the said shaft downward, so as to co-operate with the weight of the shaft and the stirrer to prevent the stirrer from being raised from the popper bottom by corn sliding under it.

(3) The providing of a simple shaft-rotating mechanism including a crank disposed at a side of the cover, where this crank can be rotated without compelling the user to dispose any part of his arm or hand above the hot top of the popper.

(4) The latching of the cover to the body of the popper by readily releasable means which include no resilient parts, and the arranging of the said latching means so that the resistance of the corn to the rotation of the stirrer will continuously tend to enforce the effectiveness of the latching.

(5) By providing popper-supporting legs of heat-insulating material which also will serve (in substitution for separately formed handles) as means whereby the popper can safely be lifted and carried about while hot, and by providing simple and effective means for fastening the said legs securely to the body of the popper.

Illustrative of the manner in which I accomplish the objects of my invention, are accompanying drawings in which:

Fig. 1 is a perspective view of an electric corn popper embodying a simple form of my invention.

Fig. 2 is an enlarged vertical and diametric section through the popper, taken along the line 2—2 of Fig. 1, with certain parts shown in elevation.

Fig. 3 is an enlarged view of portions of Fig. 2 showing the stirrer as it appears when the bottom of the popper is flat.

Fig. 4 is a view similar to Fig. 3 showing a position of the corresponding parts when the bottom of the popper has been convexed upwardly (by the effect of the heating element below this bottom) so as to raise the shaft and stirrer.

Fig. 4a is an enlarged, detail section through a gear wheel and a crank shaft and a part of a stirrup shank in which the said crank shaft is journaled.

Fig. 5 is a fragmentary horizontal section taken along the irregular line 5—5 of Fig. 2.

Fig. 6 is an enlarged, detail, vertical, fragmental section, taken along the line 6—6 of Fig. 5, showing the means for spacing the legs from the drum or body of the popper and for fastening these legs to the said body.

Fig. 7 is a reduced plan of the corn popper as it appears when the cover is detached, showing the positioning of the legs and of the latch hooks on the popper body.

Fig. 8 is an enlarged perspective view of the part of Fig. 1 within the dotted outline 8, showing a latch hook and adjacent parts as they appear when the cover is on the popper body.

Fig. 9 is a fragmentary and enlarged perspective view of the same upper portion of the drum of the popper body, showing one of the latch hooks on the upper end thereof.

In the illustrative embodiment chosen to illustrate the invention, my corn popper comprises a sheet metal drum D having two vertically spaced and normally horizontal discs spanning the bore of the drum, said discs constituting a true bottom B, and a false bottom F, the latter being below the former to provide a chamber A in which an electric heating unit is disposed. The heating unit $u$ is indicated diagrammatically by dotted lines and has its end connected to the terminals T for connection with a current supplying cord.

To control the upward bulging of the bottom B, I preferably employ a restraining bolt 1 which extends through both bottoms B and F. This bolt has at its upper end a tapered head seated in a correspondingly formed annular part 2 in the bottom B, and on a threaded part has a nut N reacting against the underside of the bottom F. The wall of the drum is formed near its lower portion with inwardly extending annular beads $d$, and the margins of the discs B and F are placed above and below said beads respectively and clamped against the same by way of the bolt 1 and nut N.

To reduce the downward radiation of heat from the chamber A toward a table top (indicated at E) or the like, I preferably attach an inverted pan 3 below the bottom F with its rim edge in contact with the lower face of the bottom F.

The bolt 1 is long enough to extend through the said part 3 and is threaded to receive a nut $n$ which clamps, by way of a washer, the part 3 upwards against the bottom F, to provide a dead air space $A^1$ and thus insulating the bottom F from the table top.

Removably seated on the open upper end of the drum D is a cover C which has a flange $C^1$ loosely fitting over the open end of the drum, this cover C having the usual perforations 4 for allowing heated air to escape from the interior of the drum. In addition, the cover has a lateral opening 10 located slightly above the part of the flange $C^1$ which seats on the upper end of the drum, this opening serving as a bearing for a crank shaft later described.

Secured to the under side of the cover is a generally U-shaped stirrup or bracket $S^2$ having feet $f$ projecting in opposite directions from the upper ends of its shanks S. This stirrup has an opening 11 in the cross-piece $S^1$ and serves as a bearing for the stirrer shaft as later described. On the cover is a handle or knob K of heat-insulating material, the knob being fastened by bolts $b$ extending through the knob K, the cover C and the feet $f$ of the stirrup $S^2$, nuts $n^1$ threaded on these bolts conjointly clamping together the parts mentioned.

The knob K, the stirrup $S^2$, the opening 10, the shaft and the stirring shaft are preferably disposed in the same vertical plane. The knob K has a recess $k$ in alinement with aperture 14 in the cover and the bearing 11 in the cross-piece $S^1$.

Seated on the popper bottom B is a stirrer 7, here shown as formed of a strip of metal seated edgewise on the bottom B and extending approximately radially thereover. This stirrer, intermediate its ends, is straddled by the slotted lower end of an upright stirrer shaft 6, the stirrer being pivoted thereto by a pin 8. The stirrer shaft 6 extends upwardly through the opening 11 and part way into the recess $k$ where a spring $6a$ is located to press against the end of the shaft 6 to normally urge the shaft downward so as to press the stirrer throughout its length against the upper face of the bottom B, and thereby prevent unpopped corn kernels from raising the stirrer and sliding thereunder.

The means for rotating the stirrer shaft 6 comprises a horizontally extending crank shaft 5 having a crank $5^a$, and a crank handle 17 on which is rotatably carried a knob 16. A bevel gear wheel G is fast on the operating end of the crank shaft and meshes with a bevel pinion P fast on the stirrer shaft 6. The crank shaft is rotatively mounted in the stirrup perforation $11^a$ and the lateral cover perforation 10. The knob 16 is preferably made of suitable insulating material, such as wood or other suitable material which is a poor conductor of heat. This knob is axially thrust on the crank handle 17 by heading or upsetting the extremity of the crank part 17 in any desirable manner.

The bevel gear wheel and pinion are preferably formed of struck-up sheet metal pieces and are rigidly secured to the crank shaft 5 and stirrer shaft 6 respectively in any suitable manner. To prevent endwise movement of the crank shaft, an annular groove $g$ is formed in the crank shaft adjacent the outer face of the stirrup shank S and in this groove is located a spring collar $g^1$ to prevent endwise movement of the crank shaft in a direction toward the shaft 6. The end portion of the crank shaft 5 is reduced in diameter and a hub $g^2$ is forced upon this reduced part, and end of this hub bearing against the shoulder formed between the reduced part and the main part of the crank shaft and also serving as an axially thrust bearing against the stirrup leg S. The gear wheel is then slipped upon the reduced end of the crank shaft and the extremity of the latter is headed solidly against the gear wheel to rigidly secure it to the crank shaft.

It is to be observed that the crank and its handle, being disposed laterally of the popper body, the crank may be rotated entirely out of the path of the hot air discharging through the perforations 4 in the cover.

The cover is held upon the popper body by means desirably formed as a part of the drum wall and which is not likely to be injuriously effected by the heat, as a spring member would be effected.

As shown, the wall of the drum is provided with oppositely disposed hook members 12 extending up from the marginal edge of the drum and the cover is formed in its flange with oppositely disposed elongated slots 13 through which the hook members extend. When the cover is placed upon the body of the popper with the hook members extending through the slots, the cover is given a slight turn in a clockwise direction, thereby bringing the hook members into engagement with the flange of the cover, thus securely fastening the cover to the body until the cover is moved in a contra clockwise direction.

The bottom of the corn popper is supported somewhat above the table, or other object upon which it is placed, by legs L which are desirably composed of wood or other material which is a poor conductor of heat. The legs L project somewhat below the bottom of the popper body and are spaced away from the side wall thereof by grommets 9, and are fastened to the wall of the popper body by bolts and nuts 9a (see Fig. 6). The legs are bored transversely as at 9b to receive the shanks of the bolts and the nuts, the diameter of the bore adjacent the popper body being of a size to receive the shank of the bolt and the bore at the outer side of the leg being of a larger diameter to receive the nut. The area of contact between each grommet and the leg L is as small as is practicable so as to reduce to a minimum the transference of heat to the leg.

With this form of construction and arrangement, very little heat is conducted from the popper body to the legs, and consequently very little heat is conducted by the legs to the table top or other surface supporting it. The legs may serve as handles by which to carry the popper about while hot.

Since the bottom F is provided with the dead air chamber $A^1$, very little heat, if any, is radiated to the table or other object upon which the popper is supported.

In the operation, with a quantity of unpopped corn on the bottom B, the cover is placed on the body and turned to be secured thereto by the hook members 12. The heat of the heating unit U is conducted through the bottom B to the kernels of corn lying thereon. The crank is rotated to thereby rotate the stirrer and thereby sweep the unpopped corn about on the bottom B. If the heat causes the bottom B to bulge upwardly, the latter will raise the stirrer and therewith the stirrer shaft 6 the upper end of which moves up in the recess $k$ and compresses the spring 6a. There is no likelihood of stirrer 7 and the shaft 6 becoming wedged between the cover and bottom.

As the stirrer shaft is raised with the pinion P the latter continues in mesh with the gear wheel G because the length of the teeth of both the gear and pinion are such as to accommodate for such relative movement as is clearly seen in Fig. 4 of the drawings. Although the pivoted part of the stirrer moves with the shaft, the stirrer still lies upon the bulged bottom and remains effective to sweep the kernels of corn around, as clearly shown in Fig. 4.

If in assembling the device the screw I and the nut N should not be tight, or the nut N becomes loose and backs off slightly, thus tending to permit the bottom B to bulge upwardly convexly, the nut $n$ would still be effective to prevent this condition if still tight. If loose it can be readily tightened because of its ready access.

If the stirrer encounters abnormal resistance which requires an increased effort for rotating the stirrer shaft, the continued rotation of the crank will tend to cause the gear wheel G to roll around the pinion P so as to tend to turn the cover in the latch-hook engagement. Consequently, the cover remains firmly latched on the popper body during the stirring.

However, by slightly turning the cover handle K in the latch-releasing direction, the user can readily free the cover so as to lift it off the popper body. During such lifting, the gearing, crank and stirrer assembly are also raised along with the cover and remain undisturbed in their operative relation, except in that the longer arm of the stirrer will then overbalance the shorter arm so as to cause the main part of the stirrer to slope downward.

To limit the just recited rocking of the stirrer about the pivot pin 8 I dispose the upper end 18 of the stirrer-straddling slot in the lower end of the stirrer shaft so that this slot end is only slightly above the upper edge of the stirrer (as in Fig. 2) when the stirrer is horizontal. Thus arranged, this upper slot end will engage the upper edge of the shorter arm of the stirrer when the cover and the elements carried by the cover are raised from their positions in Fig. 1, so as to limit the rocking of the stirrer to a position in which the lower edge of the stirrer extends at a sharp acute angle to the horizontal, thereby preventing the tip of the stirrer from catching on the popper bottom when the user replaces the assemblage of the cover with the said elements on the popper body.

To insure an intermeshable relation between the gear members G and P throughout the range of vertical movement of the pinion P, each such gear member preferably is a toothed metal stamping in which the teeth are fingers disposed in frustro-conical formation, as in Fig. 2, with the teeth forming fingers of the pinion flaring downward and with those of the gear flaring away from the stirrer shaft. Thus arranged, certain teeth of the pinion P will readily catch on the gear G to support the stirrer shaft when the cover is raised or detached.

However, while I have heretofore described an embodiment of my invention including many desirable details, changes may obviously be made without departing either from the spirit of my invention or from the appended claims.

I claim as my invention:

1. A corn popper comprising: an upwardly open can-like body, a cover member seated on the mouth end of the said body; an upright shaft supported by and journaled in the said cover member and coaxial with the said body, the shaft presenting its lower end near the bottom of the said body; a stirrer carried and rotated by the lower end portion of the said shaft, the said stirrer extending substantially radially of the said body and having a portion of its lower edge seated on the said bottom when the corn popper is not in use; an actuating member including a substantially horizontal stem journaled in the cover member and a crank fast with respect to the stem and disposed outwardly of a side of the popper body; gearing operatively interposed between the said stem and shaft; and latch means on the cover and the mouth end of the said body, the said means being constructed so as to be interlocked and released respectively by opposite rotational movements of the cover with respect to the popper body; the gearing being arranged so that a clockwise rotating of the crank rotates the said shaft in the same direction in which the cover must be rotated to release the said interlocking means, whereby the resistance of corn in the popper to the rotation of the stirrer by a clockwise rotation of the shaft tends to rotate the cover in the said latch-interlocking direction.

2. A corn popper comprising: an upwardly open can-like body, a cover member seated on the mouth end of the said body; an upright shaft supported by and journaled in the said cover member and coaxial with the said body, the shaft presenting its lower end near the bottom of the said body; a stirrer carried and rotated by the lower end portion of the said shaft, the said stirrer extending substantially radially of the said body and having a portion of its lower edge seated on the said bottom when the corn popper is not in use; an actuating member including a substantially horizontal stem journaled in the cover member and a crank fast with respect to the stem and disposed outwardly of a side of the popper body; gearing operatively interposed between the said stem and shaft; the said shaft being supported by the cover member with freedom for upward movement; the corn popper including spring means carried by the cover member for resisting an upward movement of the shaft with respect to the cover member.

3. A corn popper comprising an upwardly open can-like body; a cover seated upon and coaxial with the mouth end of the said body; a bracket fastened to and depending from the cover and presenting an upright portion spaced from the axis of the cover; a shaft coaxial with the said body and extending slidably through both the cover and the said bracket portion; means supported by and operable from the exterior of the cover for rotating the said shaft; and a stirrer carried by the lower end of the said shaft and extending radially of the popper body and contiguous to the bottom of the said body.

4. A corn popper as per claim 3, in which the said means include a stem journaled both in a peripheral portion of the cover and in a part of the said bracket, a crank fast on the outer end of the said stem, and intermeshing gear members fastened respectively to the inner end of the said stem and to the said shaft.

5. A corn popper as per claim 3, in which the said means include a stem journaled both in the peripheral portion of the cover and in a part of the said bracket, a crank fast on the outer end of the said stem, and intermeshing gears fastened respectively to the inner end of the said stem and to the said shaft; the bracket including a U-shaped part having its upper ends fastened to the said cover, and the gears extending within the space between the said U-shaped part and the said cover.

6. A corn popper as per claim 3, in which the said means include a stem journaled both in the peripheral portion of the cover and in a part of the said bracket, a crank fast on the outer end of the said stem, and intermeshing gears fastened respectively to the inner end of the said stem and to the said shaft; the bracket including a U-shaped part having its upper ends fastened to the said cover, and the gears extending within the space between the said U-shaped part and the said cover; the gears being disposed so that the gear on the said stem underhangs the intermeshing teeth of the gear on the said stem, whereby the gear on the said stem will support the said shaft and stirrer when the cover is detached from the popper body.

7. A corn popper as per claim 3, including a cover handle fastened to the top of the said cover and having a bore extending upwardly into it, the said bore being coaxial with the said shaft and the shaft extending upwardly into the said bore for only a portion of the length of the bore; and a compression spring interposed between the upper end of the said bore and the upper end of the said shaft.

8. A corn popper as per claim 3, in which the bracket has oppositely extending feet on the ends of its U-shanks; the corn popper including a cover handle fastened to the cover conjointly with the said bracket feet.

9. In a corn popper, a drumlike body open at its upper end and having a flat disclike bottom secured to the wall of the body adjacent its lower end; a cover member removably secured to the open top of the body, an upright and endwise movable stirrer shaft rotatably carried by the cover member and spring pressed in a downward direction, a stirrer lying on the flat bottom and pivotally secured between its ends to said stirrer shaft; and means supported by the cover for rotating the stirrer shaft.

10. A corn popper as per claim 9, in which the said means include a substantially horizontal stem journaled in and extending outward through a side portion of the cover member, a crank fast on the outer end of the said stem and normally depending alongside the popper body, and gearing interposed between the stirrer shaft and the said stem, the gearing being arranged for supporting the stirrer shaft so that the last named shaft will be raised off the popper body along with the cover when the cover is detached.

11. A corn popper comprising a popper body open at the top and having a disclike bottom secured to the wall of the popper body adjacent its lower end, said bottom capable of being bulged upwardly by the application of heat thereto; a cover removably secured to the open upper end of said body, a vertically movable stirrer shaft journaled in said cover and depending therefrom to the popper body bottom, resilient means to depress said stirrer shaft, a stirrer extending along said bottom and pivotally connected between its ends to said stirrer shaft, a crank operated stem rotatively carried by the cover, and gearing interposed between said stem and shaft.

12. A corn popper as per claim 11, in which the stirrer shaft has a diametric slot extending upwardly into its lower end, through which the stirrer extends, the stirrer being pivoted to the said shaft by a pin extending across the slot; the slot having its upper end disposed for engaging an upper edge portion of the stirrer to limit the swinging movement of the stirrer about the said pin to an acute angle.

13. A corn popper comprising a drumlike body open at its top and having a disclike bottom secured thereto adjacent its lower end; a centrally perforated cover removably secured on the open top of the body, a cover handle overlying the central portion of the cover and having a bore extending upwardly into it coaxial with the cover; a bracket depending from the cover and including a bracket part extending across the axis of the cover; a stirrer shaft extending upwardly through and journaled in the said bracket part and slidably into the said handle bore; a compression spring disposed within the said handle bore for urging the stirrer shaft downwardly; a stirrer pivotally secured between its ends to the lower end of the stirrer shaft and resting upon the bottoms; and means supported by the cover for rotating the stirrer shaft.

14. A corn popper as per claim 13, in which the said means including a pinion fast on the stirrer shaft, and a gear meshing with the said pinion, the pinion having a hub disposed for engaging a part of the cover to limit the upward sliding of the stirrer shaft.

15. A corn popper comprising: a body provided with a bottom upon which the corn is heated and pops; a detachable cover for the said body; a stirring mechanism supported by the cover and comprising an upright stirring shaft supported with freedom for limited slidable vertical movement, a stirring element connected to said stirring shaft and extending over said bottom, a manually operated crank shaft, means carried by said cover for rotatively supporting said shafts, and means for operatively connecting said shafts whereby said crank shaft drives said stirring shaft, the said connecting means including two gears respectively associated with the two shafts and adapted to maintain their operative connection while permitting a vertical movement of the stirring shaft.

BERNHART A. BENSON.